Patented Dec. 3, 1946

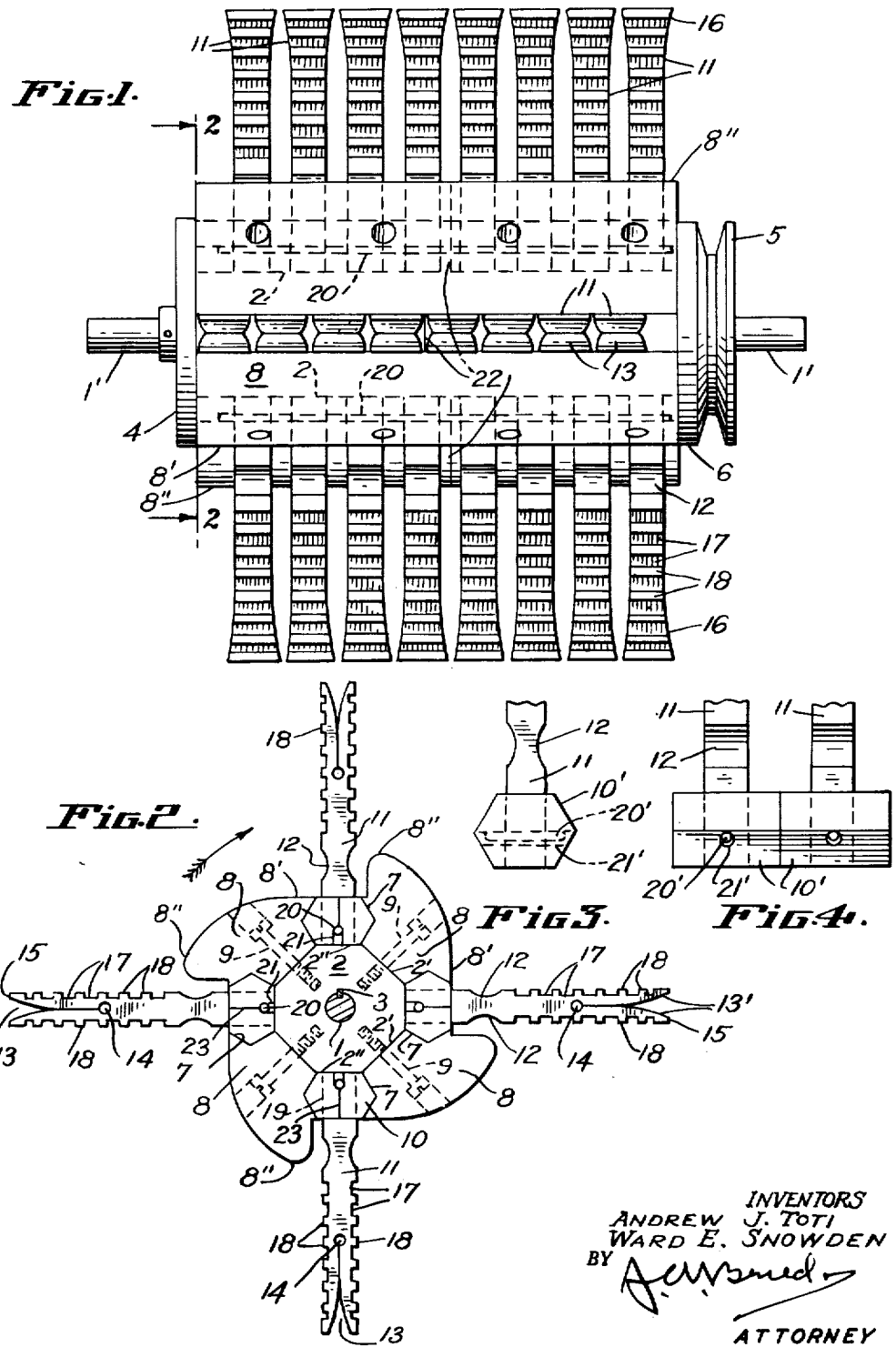

2,412,108

UNITED STATES PATENT OFFICE 2,412,108

FOWL PICKER

Andrew J. Toti and Ward E. Snowden, Modesto, Calif., assignors, by direct and mesne assignments, to Modesto Manufacturing Co., Modesto, Calif., a corporation of California Application March 29, 1945, Serial No. 585,426

15 Claims. (Cl. 17—11.1)

This invention relates to devices for mechanically removing the feathers from chickens and other fowl, and the principal object of the invention is to provide improvements in picking or feather engaging elements of the machine and their mounting.

Other features and advantages of the invention will appear in the following description and accompanying drawing.

In the drawing:

Fig. 1 is a front elevation of a rotor for a fowl picking machine embracing our improvements.

Fig. 2 is an end view of the rotor of Fig. 1 as seen from along the line 2—2 of Fig. 1.

Fig. 3 is an end elevation of a modified anchoring of the inner end of the feather removing fingers.

Fig. 4 is a side view of the arrangement shown in Fig. 3.

Before describing the drawing in detail it may be stated that in some types of chicken or fowl picking devices a rotatable drum or belt passing over a pulley, carries a series of radially projecting flexible fingers with notches or projections on them and which fingers strike a fowl presented in their path and beat and pull the feathers from the fowl as it is turned about to permit the flexible fingers (usually of soft rubber) to strike and draw across all feathered surfaces of the fowl. In some of the machines the birds are held in the hand when presented to the action of the fingers, while in other machines the birds are mechanically presented and turned about.

Since the present invention relates to the fingers and their mounting only it follows that it may be used with either type of machine, and as the other features of the machine are not concerned with the present improvements, the rest of the machine is not shown in the drawing as it may take most any form.

In the drawing, 1 is a shaft or axle upon which an elongated hub or core 2 is mounted and which hub is preferably secured to the shaft as by a suitable key 3. The shaft projects considerably beyond both ends of the hub so as to provide sufficient length of shaft for bearing support at its free ends 1', while at one end of the hub is a flange 4 secured to the shaft and at the opposite end is secured a driving pulley 5 preferably with an inner flange-like rim 6 bearing against the end of the hub similar to the flange 4.

The hub 2 may be made of metal, tho we find hard wood, fiber, or plastic quite suitable for the purpose. It is preferably of substantially octagonal cross section if four rows of fingers are used, or of any other suitable cross section if more or less than four rows of fingers are to be used, and the cross section is uniform for the full length of the hub so that it is easily shaped of wood or fiber by running it past a saw or over a revolving shaper head.

Secured to some of the flat sides 2' of the hub are elongated guard strips 8 spaced to cooperate with intermediate flat sides 2" of the hub to form a polygonal socket 7. These strips extend for the length of the hub 2 and are V grooved on confronting edges as indicated to form the socket 7, and are individually secured to the hub as by a plurality of screws 9 countersunk into the outer surface of the guards. The form and object of these guards will be explained later on.

Within the polygonal sockets 7 are soft flexible blocks or strips 10 projecting radially outward from which are series of soft flexible picker fingers 11. Both the fingers and the blocks are preferably made of soft tough resilient rubber, either natural, synthetic, or similar substitute, so that the fingers in striking a fowl will readily bend over and twist about to contact the varying surface of the fowl, and to which end the soft mounting socket 10 greatly contributes.

The fingers are preferably square in cross section where they pass into the sockets 10 and are reduced both front and back just above the sockets as by curved cut-outs 12 to make them more flexible at this point, while at the outer end they are split or bifurcated as at 13 downward for about a third or half the length of the finger terminating with a transversely extending hole 14, thus making the bifurcated ends capable of independent flexing yet the leading one (in rotation of the assemblage) being supported by the resistance of the rearward end. The bifurcated ends are tapered off from the center both forwardly and backwardly at 13' to relatively narrow outer edges 15 which in turn are broadened laterally as at 16 into what may be termed a fish-tail form as shown in Fig. 1 of the drawing, while extending transversely across both front and back flat surfaces of the fingers are grooves 17 or ridges 18.

The form of the fingers as above described contributes greatly to the efficiency of the fingers in engaging the feathers, and the fish-tail curves 16 of adjacent fingers tend to converge some of the feathers between them to pinch and pull them out. Another feature is that being symmetrical, the fingers may be reversed when the sharpness of the ridges 18 has been badly worn, and to which end the special mounting of the fingers has a particular object.

The mounting block 10 is preferably of hexagonal cross-section outwardly and fits tightly within the hexagonal socket 7 formed by the hub and cooperating V depressions cut out of the two adjacent edges of guard strips 8 all so that upon removal of but one of the strips two rows of the fingers with their mounting blocks may be bodily lifted out and reversed end for end and replaced, to thus quickly reverse the wearing surface of the fingers when it becomes necessary.

The mounting blocks 10 may be a continuous solid strip of soft rubber with square holes 19 extending through it to receive the lower ends of the fingers which are formed with holes to receive a pin or wire 20 passing through the entire row of fingers and seated in a groove 21 formed in the block, or the block may be cut off into two or more sections as indicated at 22 in Fig. 1, and additionally parted vertically along the center as indicated at 23 in Fig. 2 to make the insertion of the fingers easier.

A modified arrangement for the mounting blocks is as shown in Figs. 3 and 4 where the rubber blocks 10' are individual for each finger and simply arranged in abutting relation in the hexagonal grooves of the drum. The retaining pins 20' are here shown as extending transversely of the axis of the drum in a hole 21' preformed in the block. With such an arrangement only those fingers which are badly worn need be reversed, and/or the central fingers may be exchanged with the end fingers to distribute the wear.

While we show hexagonal mounting blocks for the fingers it is manifest that they may be square or round or of other form in cross section though the hexagonal form is the simplest to assure alignment and firm clamping in place.

In regard to the guard strips 8, it will be noted that they are lower on their leading edges 8' and highest (radially) on their following edges 8" where they extend in front of the row of fingers 11 a substantial distance above the mounting blocks in which the fingers are secured. This is an important feature in keeping the fowl outward where the fingers are most flexible and prevents entangling the necks and wings of the fowl between the fingers adjacent their bases which otherwise sometimes takes place. It is manifest that considerable variation in the form of these guards may be made with the object above stated kept in mind.

In Fig. 1 it will be noted that the defeathering fingers are spaced along each row and with the fingers of one row staggered in relation to those of the succeeding row. This is also a desirable feature, tho with our fish-tail form of fingers each row makes substantially a clean sweep over the area through which it travels and yet present spaces for the feathers being operated upon—a feature unique to the present construction.

From the above description it will be evident that the fingers could be secured to the sockets by cement or the like, but the pin fastening is preferred as making for easier and cheaper construction and assembly.

Having thus described our improved construction in a fowl picking or plucking apparatus and the manner of its operation, what we claim is:

1. In a fowl picker having feather picking elements, a rotatable carrier for the picking elements comprising a plurality of sockets extending across the carrier, mounting blocks secured in said sockets, and rows of soft resilient fingers constituting the picking elements secured in said blocks and projecting outwardly therefrom.

2. In a fowl picker having feather picking elements, a rotatable carrier for the picking elements comprising a plurality of sockets extending across the carrier, soft resilient mounting blocks secured in said sockets, and rows of soft resilient fingers constituting the picking elements secured in said blocks and projecting outwardly therefrom.

3. In a fowl picker having feather picking elements, a rotatable carrier for the picking elements comprising a plurality of sockets extending across the carrier, mounting blocks secured in said sockets, and rows of soft resilient fingers constituting the picking elements secured in said blocks and projecting outwardly therefrom, the portions of the fingers secured in the blocks each having a hole through them, and a pin passing through the hole seated in a channel formed in the block.

4. In a fowl picker as set out in claim 1, said sockets each formed in part by a removable side wall to facilitate placing and removal of said blocks.

5. In a fowl picker as set out in claim 1, said sockets and blocks being of complemental polygonal form.

6. In a fowl picker having rows of flexible picking fingers, guard means in advance of each row of fingers when in operation adapted to keep a fowl outward away from the inner portions of the picking fingers.

7. In a fowl picker having rows of flexible picking fingers, guard means in advance of each row of fingers when in operation adapted to keep a fowl outward away from the inner portions of the picking fingers, said guard means comprising strips of material extending along the rows of fingers and formed to cooperate in holding the fingers in place.

8. In a fowl picker of the character described, picking elements comprising elongated fingers of soft resilient material formed with outwardly flaring tapered and flattened outer ends of general fish-tail form.

9. In a fowl picker of the character described, picking elements comprising elongated fingers of soft resilient material formed with outwardly flaring tapered and flattened outer ends of general fish-tail form, said ends being bifurcated in the plane of the flattened ends to present two similar outer flattened fish-tail like ends, and opposite faces of the two ends respectively being roughened.

10. In a fowl picker of the character described, picking elements comprising elongated fingers of soft resilient material formed with outwardly flaring tapered and flattened outer ends of general fish-tail form, said ends being bifurcated in the plane of the flattened ends to present two similar outer flattened fish-tail like ends, and opposite faces of the two ends respectively being roughened, the bifurcation terminating in an enlarged opening extending transversely through the finger.

11. In a fowl picker of the character described, a carrier with picker fingers extending therefrom, said picking fingers being of soft resilient rubber of generally rectangular cross section secured at their inner ends to the carrier and formed with a reduced neck between their secured portion and their outer operative portions.

12. In a fowl picker of the character described, a carrier with picker fingers extending therefrom, said picking fingers being of soft resilient rubber of generally rectangular cross section secured at their inner ends to the carrier and formed with a reduced neck between their secured portion and their outer operative portions and provided with a deeply bifurcated outer end with each free end flattened.

13. In a fowl picker of the character described, a carrier with picker fingers extending therefrom, said picking fingers being of soft resilient rubber of generally rectangular cross section secured at their inner ends to the carrier and formed with a reduced neck between their secured portion and their outer operative portions and provided with a deeply bifurcated outer end with each free end flattened and spread laterally in substantially fish-tail form.

14. In a fowl picking machine a drum comprising a shaft, an elongated hub on said shaft, a plurality of longitudinally extending segments spacedly secured to said hub with edges in confronting relation, the edges of said segments formed to provide retaining sockets, finger mounting blocks confined in said sockets and radially extending soft rubber fingers secured at their inner ends in said blocks.

15. In a fowl picking machine a drum comprising a shaft, an elongated hub on said shaft, a plurality of longitudinally extending segments spacedly secured to said hub with edges in confronting relation, the edges of said segments formed to provide retaining sockets, finger mounting blocks confined in said sockets and radially extending soft rubber fingers secured at their inner ends in said blocks, said blocks being of soft rubber and of symmetrical design so as to be reversible 190° with said fingers in said sockets.

ANDREW J. TOTI.
WARD E. SNOWDEN.

Certificate of Correction

Patent No. 2,412,108.                   December 3, 1946.

ANDREW J. TOTI ET AL.

It is hereby certified that the name of the assignee in the above numbered patent was erroneously described and specified as "Modesto Manufacturing Co.", whereas said name should have been described and specified as *Modesto Products Manufacturing Co.*; and that the said Letters Patent should be read with this correction therein that the same may conform to the record of the case in the Patent Office.

Signed and sealed this 25th day of February, A. D. 1947.

[SEAL]

LESLIE FRAZER,
*First Assistant Commissioner of Patents.* from, said picking fingers being of soft resilient rubber of generally rectangular cross section secured at their inner ends to the carrier and formed with a reduced neck between their secured portion and their outer operative portions and provided with a deeply bifurcated outer end with each free end flattened.

13. In a fowl picker of the character described, a carrier with picker fingers extending therefrom, said picking fingers being of soft resilient rubber of generally rectangular cross section secured at their inner ends to the carrier and formed with a reduced neck between their secured portion and their outer operative portions and provided with a deeply bifurcated outer end with each free end flattened and spread laterally in substantially fish-tail form.

14. In a fowl picking machine a drum comprising a shaft, an elongated hub on said shaft, a plurality of longitudinally extending segments spacedly secured to said hub with edges in confronting relation, the edges of said segments formed to provide retaining sockets, finger mounting blocks confined in said sockets and radially extending soft rubber fingers secured at their inner ends in said blocks.

15. In a fowl picking machine a drum comprising a shaft, an elongated hub on said shaft, a plurality of longitudinally extending segments spacedly secured to said hub with edges in confronting relation, the edges of said segments formed to provide retaining sockets, finger mounting blocks confined in said sockets and radially extending soft rubber fingers secured at their inner ends in said blocks, said blocks being of soft rubber and of symmetrical design so as to be reversible 190° with said fingers in said sockets.

ANDREW J. TOTI.
WARD E. SNOWDEN.

Certificate of Correction

Patent No. 2,412,108.   December 3, 1946.

ANDREW J. TOTI ET AL.

It is hereby certified that the name of the assignee in the above numbered patent was erroneously described and specified as "Modesto Manufacturing Co.", whereas said name should have been described and specified as *Modesto Products Manufacturing Co.*; and that the said Letters Patent should be read with this correction therein that the same may conform to the record of the case in the Patent Office.

Signed and sealed this 25th day of February, A. D. 1947.

[SEAL]

LESLIE FRAZER,
*First Assistant Commissioner of Patents.*